Patented Dec. 3, 1929

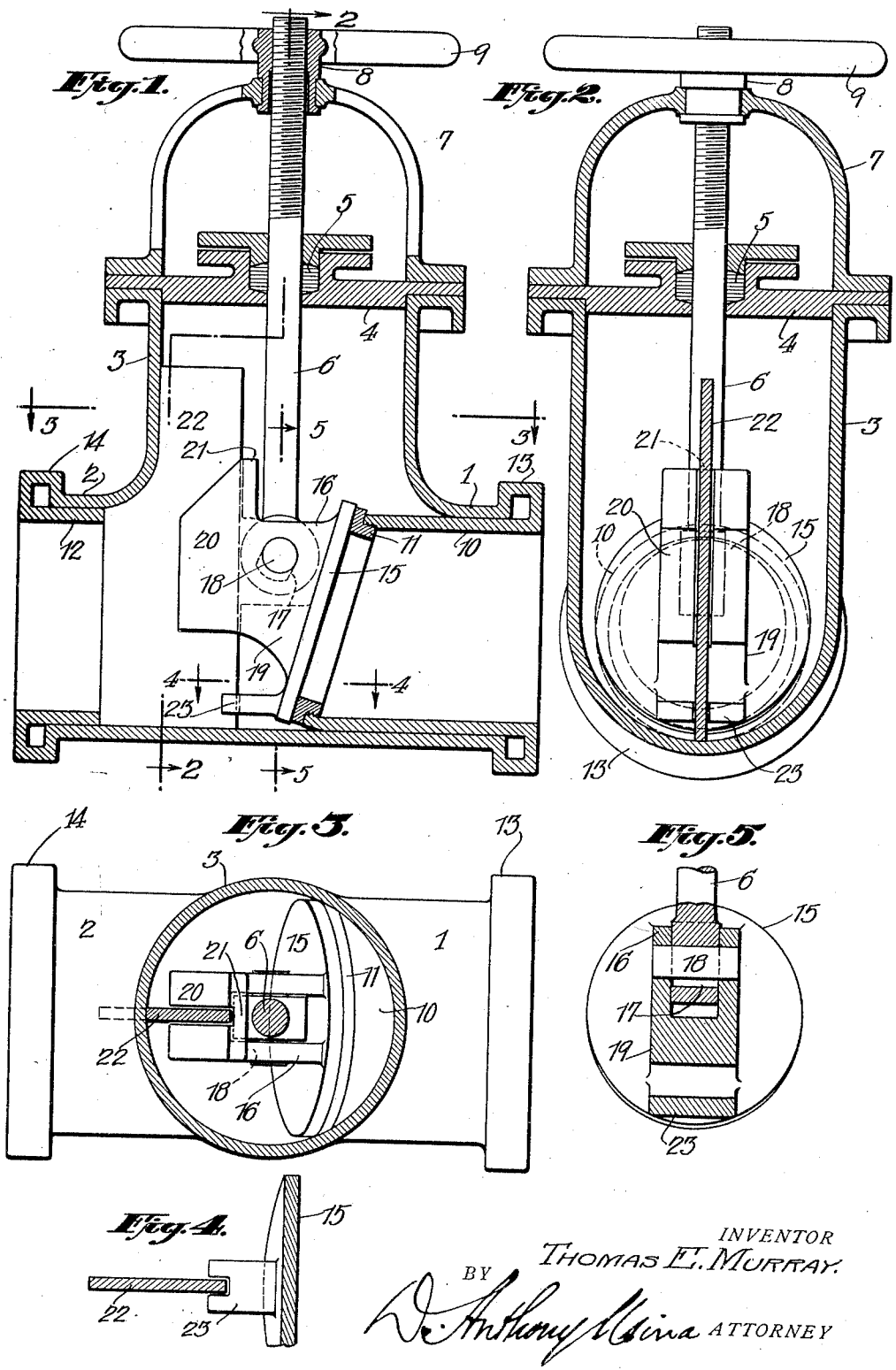

1,738,014

UNITED STATES PATENT OFFICE

THOMAS E. MURRAY, OF BROOKLYN, NEW YORK; JOSEPH BRADLEY MURRAY, THOMAS E. MURRAY, JR., AND JOHN F. MURRAY, EXECUTORS OF SAID THOMAS E. MURRAY, DECEASED

GATE VALVE

Application filed June 18, 1927. Serial No. 199,645.

My invention aims to provide an improvement by which the construction of gate valves and the like may be simplified and improved.

The accompanying drawings illustrate an embodiment of the invention.

Fig. 1 is a longitudinal section of a valve;

Fig. 2 is a vertical section approximately on the line 2—2 of Fig. 1;

Figs. 3 and 4 are horizontal sections on the lines 3—3 and 4—4 of Fig. 1;

Fig. 5 is a vertical section on the line 5—5 of Fig. 1.

The main casing comprises branches 1 and 2 in line with each other and an upright branch 3 on the top of which is a diaphragm 4 with a stuffing box 5 through which the operating stem 6 passes. Above the diaphragm is a bonnet 7 in the upper end of which is rotatably mounted the hub 8 of the operating wheel 9, the hub having an internal thread engaging the threaded upper end of the operating stem for raising and lowering the latter.

The end casing is provided within the branch 1 with an inwardly projecting tubular portion 10 in the end of which is mounted the valve seat 11. The opposite branch 2 is provided with a similar inward extension 12 forming at its inner end a shoulder. A casing of this construction can be economically made of sheet metal segments welded together along the plane which lies in the intersecting axes of the parts 1, 2 and 3, the segments being made of two flat sheets which are first bent in at the ends to form the parts 10 and 12 and the flanges 13 and 14 and are then bent up to segmental shape; all as described in certain previous applications which I have filed. Or the casing may be made in any other usual or suitable way.

The valve disc 15 has on its rear face projecting arms 16. The end of the stem extends between these and has a slot 17 in which lies a pin 18 extending transversely through the arms 16, so as to allow a slight play.

The lower portions of the arms 16 are united solidly below the stem across the space between them as indicated at 19 (Fig. 5). They are also extended rearwardly to form guides 20 and a cross piece or stop 21 embracing the sides and the forward edge of a fixed plate 22 extending vertically and lengthwise of the casing, to which it is welded. The parts 19 and 21 bear against the edge of the plate 22 and the latter bears at its opposite edge against the branch 3 of the casing and against the shoulder formed by the part 12.

In addition near the low point of the valve 15 there is a projection 23 which is also forked to embrace the rear edge of the plate 22 to assist in guiding the valve. I have shown the guides 20 and 23 as separate projections from the valve disc 15. This has the advantage of lightness compared with extending the guide continuously.

When the stem is lifted the weight of the valve holds it loosely against the guiding plate 22. The clearance 17 below the pin 18 is slightly oblique so as to press the upper part of the valve disc also rearwardly, that is, toward the guiding plate 22. When the stem is lowered the valve moves freely to its seating position. As it is pressed down it will be wedged between the guide 22 and its seat 11 while free to rock slightly about the centre of the pin 18 so as to make a good fit against its seat.

Various modifications may be made by those skilled in the art without departing from the invention as defined in the following claims.

What I claim is:

1. A valve including in combination a tubular casing, a fixed guide surface extending transversely of the said casing, a valve seat slightly inclined to said guide surface, a valve disc having guiding means on its rear face engaging and guided by said guide surface and a stem movable in a direction transverse to the casing and having a wedging engagement with the valve disc for forcing the latter against its seat.

2. A valve including in combination, a tubular casing, a guide surface extending transversely of said casing, a valve seat slightly inclined to said guide surface, a valve disc adapted to seat on said valve seat and having guiding means on its rear face engaging and guided by said guide surface, and a stem movable in a direction transverse to said casing, said stem having a slot inclined to said guide surface and said stem having a pin passing through said slot.

3. A valve including in combination, a tubular casing, a fixed guide edge extending transversely of said casing, a valve seat within said casing in a plane at an angle to said guide edge, a valve stem movable transversely of said casing between said guide edge and said valve seat, and a valve plate adapted to seat on said valve seat and having a rearwardly extending portion sliding on said guide edge and having an inclined slot connection to said valve stem.

In witness whereof, I have hereunto signed my name.

THOMAS E. MURRAY.